Oct. 15, 1935.  C. W. SIMMONS  2,017,447
CUTTING TOOL
Filed Sept. 22, 1933
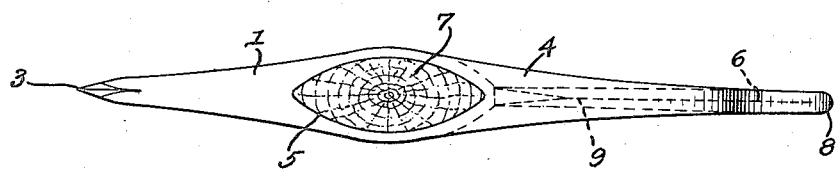
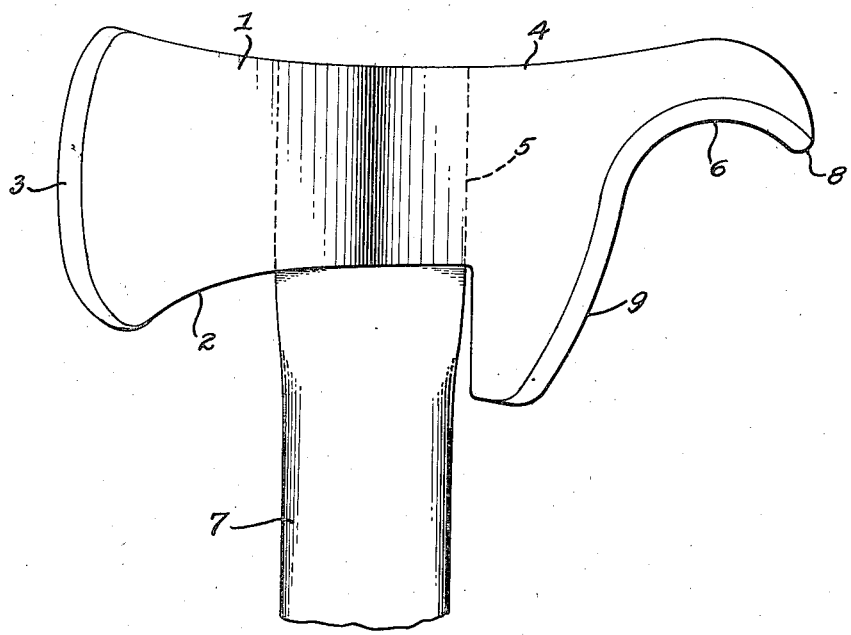
INVENTOR
C. W. SIMMONS
ATTORNEY Patented Oct. 15, 1935

2,017,447

UNITED STATES PATENT OFFICE 2,017,447

CUTTING TOOL

Charles Wade Simmons, Bryan, Tex.

Application September 22, 1933, Serial No. 690,606

1 Claim. (Cl. 30—11)

(Granted under the act of March 3, 1883, as amended April 30, 1928; 370 O. G. 757)

This application is made under the act of March 3, 1883, as amended by the act of April 30, 1928 and the invention herein described, if patented, may be manufactured and used by or for the Government for governmental purposes without payment to me of any royalty thereon.

This invention relates to improvements in a steel woods improvement tool in which a modified brush or brier hook blade is combined in one tool with an axe blade. The objects of the improvement are, first to retain all the old advantages of an axe on one side for chopping, splitting, deadening, girdling, felling, swamping, clearing, etc.; second to use the improved blade hook to trim (prune) more efficiently than any other tool the limbs off of your limby commercial trees to a convenient ground working height of about 7 feet up the tree; third, to cut (swamp) efficiently small limbs on felled timber; fourth, to peel bark on trees more efficiently than the axe; fifth, to deaden small trees faster than one could with the axe; sixth, to sever the live wood growth which curls back in cavities of trees to be deadened that cannot be reached by the axe blade without chopping out a deep notch; seventh, as a bush hook to cut bushes, vines, briers and clumps of weeds by a hook or sweeping motion; eighth, to thin small saplings more efficiently than one can with an axe. It is believed to be a more versatile and useful tool than the double bit axe for general farm requirements. It can be used to good advantage fire brushing out and constructing right-of-ways and fire lines. Its point is somewhat similar to a fireman's axe and could be used for the same purpose. Surveyors have said that it would be a valuable tool for their work. It has its place in military operations, particularly in the United States Engineer Corps. When necessary it can be used as a pick. It is well adapted to cutting roots in the ground. Those who have tried it out express their approval of its multiple uses and good chopping balance. One side of the tool contains all the improvements concerning a blade hook to be used for the above uses.

The invention is shown in the accompanying drawing in which Figure 1 is a plan view of the entire device and Figure 2 is an edge view of the steel blade.

As will be observed from the drawing the head of the tool comprises a steel blade 1, one end of which is formed into an axe blade 2 having a convex cutting edge 3. The other end of the steel blade 1 is formed into a hook-shaped blade 4, the sharpened portion 9 of the hook-shaped blade being on the handle side of the blade. The handle 7 of the implement is secured in the usual manner to the steel blade through the eye 5. As made and used by me the total cutting edge of the blade is about 6¾ inches. This blade is given a convex edge to facilitate cutting and light chopping. The cutting edge 9 of the hook-shaped portion of the steel blade extends about 2⅝ inches above the blade. Its cutting edge is given a concave curve 6 adjacent to the hook point 8 to prevent its sliding off of the small brush stems while the balance of this cutting edge is convex. The distance from head of the axe to the back of the blade is 5⅛". The thickness near the head of the blade one inch from the edge of the eye 5 is ⅝", tapering down to ⅜" about half way across the blade and to ¼" for the remaining space. The thickness also tapers from ⅝" to a point about one inch from the tip of the hook where the thickness is about ⅜ of an inch. The hook is 1½" wide about half way from the blade to the tip. From the base of the hook to the edge of the eye the width of the blade is about 2⅝". The width at the lower end of the blade is about 1". The distance from the center of the "eye" to the tip is about 6½". The metal thickness at both ends of the eye is ⅞". The width of the "eye" at the widest point is about 1". The length of the "eye" at the longest point is about 3". The thickness of the metal on either side of the "eye" is about ⅛". The eye is made slightly larger than one for an axe to give greater handle strength. The width of the axe at the eye is 3". The total length from the hook tip to edge of the axe blade is 11½". The axe blade and its cutting edge are the same shape as one side of an ordinary 3½ pound double bit axe. The handle should be two or three inches longer than an ordinary double bit axe handle but should have the same shape otherwise. An ordinary double bit axe handle will fit the eye.

Having fully disclosed my discovery, I claim as my invention:

In a cutting tool of the character described, a blade, and a handle extending centrally from the back of the blade, said blade having a projection at one end and at the front thereof and a second projection at the back of the blade extending along the handle, the edge of the blade between the two projections being sharpened to a continuous cutting edge and formed in an abrupt concave edge and a convex edge, the concave cutting edge being distinctly hook shaped and adjacent the first mentioned projection, whereby materials being cut will not slide off said hook shaped cutting edge before being severed, and the convex cutting edge being adjacent the second mentioned projection.

CHARLES WADE SIMMONS.